Nov. 3, 1970        E. L. VOLLING        3,538,302
HEATING UNIT FOR INDUSTRIAL INSTRUMENTS
Filed July 17, 1968
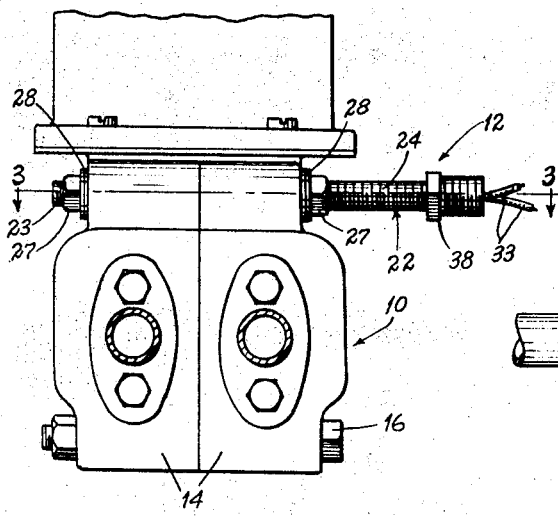
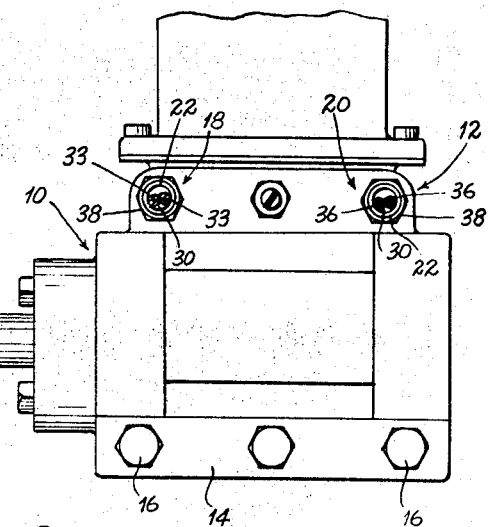
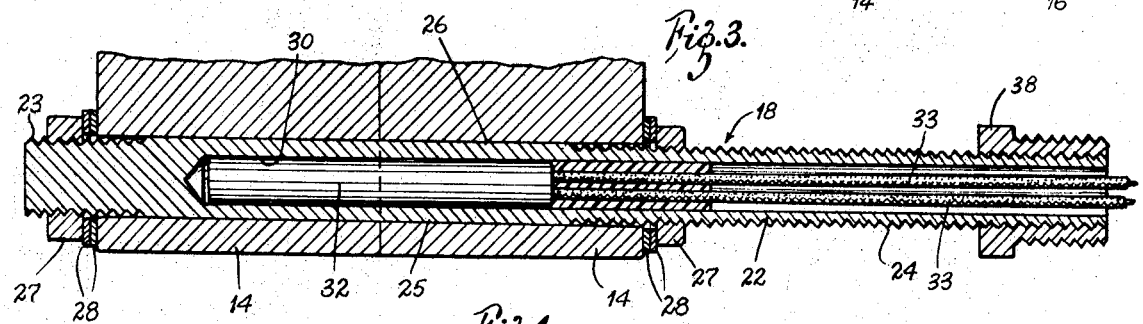
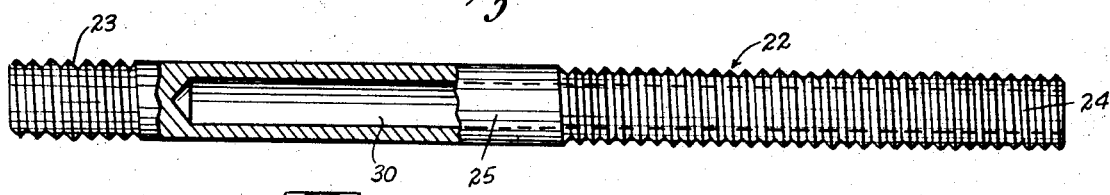
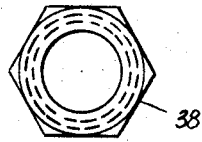
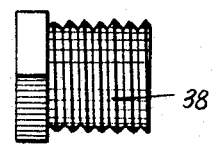
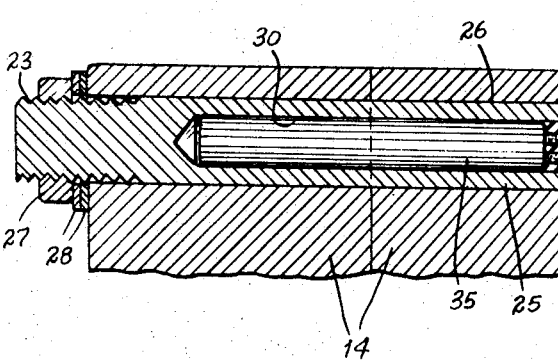
INVENTOR:
ELDEN L. VOLLING,
BY Kingsland, Rogers, Ezell, Eilers & Robbins
ATTORNEYS United States Patent Office 3,538,302
Patented Nov. 3, 1970

3,538,302
HEATING UNIT FOR INDUSTRIAL INSTRUMENTS
Elden L. Volling, East Alton, Ill., assignor to O'Brien Corporation, St. Louis, Mo., a corporation of Missouri
Filed July 17, 1968, Ser. No. 745,555
Int. Cl. H05b 1/00
U.S. Cl. 219—201                                3 Claims

ABSTRACT OF THE DISCLOSURE

An automatically controlled electrical heating unit for industrial instruments, such as a pneumatic or electronic flow differential pressure transmitter, comprising a first elongated externally threaded stud having a deep well therein adapted to replace a selected nut and bolt holding together the casing of the instrument, an electric cartridge heater within the stud well, compression washers and nuts for maintaining the stud in place in casing securing relation, a second identical elongated externally threaded stud for replacing a second selected casing nut and bolt of the instrument, a temperature switch in the well of the second stud, compression washers and securing nuts for the second stud, and electrical wiring interconnecting the cartridge heater and the temperature switch pnoviding automatic energization or deenergization of the heater upon the instrument body temperature falling below or rising above a predetermined level.

BACKGROUND OF THE INVENTION

Field of the invention

The present invention relates generally to the art of heating industrial instruments required to function in weather which otherwise would cause oversluggishness or freezing of fluids sensed thereby, effecting malfunctioning unless heated to maintain fluidity, and more particularly to novel automatic electrical means for so heating such industrial instruments.

Description of the prior art

Heretofore, many efforts have been made to heat industrial instruments of the type mentioned, but those known to the applicant are expensive, difficult to maintain operative, bulky, thus requiring additional space, and otherwise deficient. There has long existed the need in the heating of industrial instruments of the type concerned of a unit for maintaining fluid in the instrument at required temperature in cold weather which, in effect, is integrated with the instrument for maximum efficiency in heat transfer and in long trouble-free use.

SUMMARY OF THE INVENTION

In brief, the present novel unit for heating industrial instruments, such as differential pressure cells and others, comprises a first externally threaded stud having an elongated cartridge heater snugly encased therein in heat transfer relation thereto, a second externally threaded stud having an elongated temperature switch encased therein in heat sensitive relationship therewith, said studs being of a size for replacement of selected body or casing nut and bolt assemblages of the industrial instrument to be heated, compression washers and nuts for securing the studs in body securing relation, said temperature switch being electrically connected to said cartridge heater for automatically energizing and deenergizing the same as the temperature falls below and rises above, respectively, a selected temperature, there being supplied a plug or other facility for connecting the heating unit to a source of electrical power.

Therefore, objects of the present invention are to provide a novel heating unit for selected industrial instruments which fulfills the long existing need in the industry, which is adapted to function effectively and efficiently for a long period of time with minimal maintenance, which can be readily replaced as to parts or as to the whole unit quickly, inexpensively, and with little or no down-time in the use of the industrial instrument, which is capable of application to a wide range of outdoor industrial instruments, which adapts itself to package application, and which otherwise serves its intended purposes. The foregoing and other objects and advantages are apparent from the detailed description below taken with the accompanying drawings.

BRIEF DESCRIPTION OF THE DRAWINGS

FIG. 1 is a front elevational view of a flow differential pressure cell transmitter with the present novel heating unit mounted therein;

FIG. 2 is a side elevational view of the structure of FIG. 1, the flow conduits being broken away;

FIG. 3 is an enlarged horizontal cross-sectional view through a portion of the transmitter and through the stud with the enclosed cartridge heater;

FIG. 4 is a plan view of an externally threaded stud forming part of the present invention, a portion being broken away and in section to illustrate the well;

FIG. 5 is an end view of an adapter;

FIG. 6 is a side view thereof; and

FIG. 7 is a view similar to FIG. 3 through the other stud enclosing the temperature switch device.

DESCRIPTION OF THE PREFERRED EMBODIMENT

Referring to the drawings more particularly by reference numerals, 10 indicates generally a flow differential pressure cell transmitter, such as the type 13A or 13A1 flow differential pressure cell transmitter of the Foxboro Company, Foxboro, Mass., with which the present novel industrial instrument heating unit 12 is integrated or operatively mounted. The transmitter 10 includes opposed housing or casing segments 14 which are secured together by bolt and nut assemblies 16. The unit 12 includes a first stud assembly 18 and a second stud assembly 20, shown as replacing the upper standard nut and bolt assemblies 16 of the casing segments 14. It will be noted that the stud assemblies 18 and 20 are to replace selectively removed nut and bolt assemblies 16 based on the heating requirements of each particular industrial instrument.

The stud assembly 18 includes an elongated stud 22 having external threads 23 and 24 at opposite ends with a smooth portion 25 therebetween which is of a diameter providing a close fit in the bolt hole bore 26. A nut 27 and two disc compression spring washers 28, the inner washer 28 at each side engaging the outer surfaces of the housing segment 14, maintain the stud 22 securely in position and the housing elements 14 securely in abutting relation. The washers 28 are of predetermined strength and strong enough to securely hold the housing segments 14 when flattened, thereby obviating the necessity of a torque wrench in installation. Further, the washers 28 negative growth or expansion of the stud 22 under heat by providing a substantially constant holding force against the casing segments 14 to maintain a tight fit. The well 30 extends into the stud 22 for a major portion thereof and receives a cartridge heater 32, the leads 33 of which extend outwardly from the open end of the stud 22. Any good cartridge heater is satisfactory, one by Watlow, St. Louis, Mo., being presently employed by applicant. Wattage, of course, will vary, depending upon the job to be performed. A small 25-watt heater, some ¼" x 3" will keep water from freezing under a given temperature range, whereas, much higher wattage, as 300-watts, may be required to keep asphalt from becoming sluggish. The heater 32 is a tight fit in the well 30 to insure maximum heat transfer from heater to the stud, the stud being a tight fit, as stated above, to insure a continued transfer to the metal casting of the instrument and to the liquid within the instrument to maintain the required fluidity. The cartridge heater 32 is potted, as with high temperature silicon rubber or type of cement, to maintain it securely in the well and seal the unit from effects of moisture.

The stud assembly 20 is identical with the stud assembly 18, the same reference numerals being employed for identical parts. Within the well 30 is an on and off temperature switch 35 having leads 36. The switch 35 snugly fits within the well 30 to maintain efficient heat transfer from the stud 22 thereto, and is set to open on temperature rise at a predetermined temperature, for example, 50° F. ±10°. The switch 35 used presently is by Fenwall, Ashland, Mass., and closes when the temperature drops below a predetermined actuating level. As with the cartridge heater 32, the temperature switch 35 is potted into the stud. One lead 33 is connected to one lead 36 and the other leads 33, 36 are connected to a suitable plug (not shown), or the like, for connecting the unit 12 into a source of electrical alternating current.

It is to be understood, of course, that several stud assemblies 18 and stud assemblies 20, or combinations thereof, may be employed.

Internally-externally threaded adapter bushings 38 are provided to change from the straight machine threads on the stud to a common electrical conduit tapered pipe thread.

It is clear from the foregoing description taken with the drawings that the present novel heating unit for industrial instruments is adapted to automatically provide heat to concerned instruments, as required to maintain the proper fluidity of fluids within the instrument.

It is apparent that there has been provided a novel heating unit for selected industrial instruments which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:
1. In combination, a differential pressure transmitter, adapted to be subjected to cold weather conditions including a casing, and an automatically operated heating unit integrated with said casing comprising a first substantially hollow stud assembly, electrical heating means secured in said first stud assembly, a second substantially hollow stud assembly, temperature activated control means secured in said second stud assembly for temperature sensing of said casing, said temperature actuated control means being electrically connected to said electrical heating means for automatic control thereof, and means for conducting supplied electrical power to said two means, said first and second stud assemblies replacing two spaced conventional nut and bolt assemblies of said casing physically and functionally, said electrical heating means being adapted to supply required heat to the interior of said casing through the stud and casing upon demand from said control means to maintain required fluidity of fluids therein being sensed thereby.

2. The combination of claim 1 in which said electrical heating means includes a cartridge heater secured within said hollow stud for heat transfer through the latter to said transmitter casing and contained fluid and in which said temperature actuated control means includes a temperature switch adapted to open as the temperature rises to a predetermined general level and to close as the temperature drops below said predetermined general level.

3. The combination of claim 1 in which each stud assembly includes an externally threaded stud, disc compression spring washers of predetermined strength, and nuts for holding said washers flattened against the external surface of the casing of said transmitter for maintaining a tight engagement compensating for elongation expansion of the stud on heating.

References Cited
UNITED STATES PATENTS

| | | | |
|---|---|---|---|
| 1,839,850 | 1/1932 | Hodgkinson | 219—50 X |
| 2,176,601 | 10/1939 | Bates | 219—50 |
| 2,306,709 | 12/1942 | Miller | 219—50 |
| 3,350,544 | 10/1967 | Lennox | 219—494 X |
| 2,611,066 | 9/1952 | Freeman | 219—523 |
| 2,632,083 | 3/1953 | Shaffer | 219—209 |
| 2,834,864 | 5/1958 | Grinde | 219—208 |
| 2,863,024 | 12/1958 | Romine | 337—380 |

JOSEPH V. TRUHE, Primary Examiner

P. W. GOWDEY, Assistant Examiner